June 11, 1968  B. J. PATTON  3,387,377
MAGNETOMETER UTILIZING A MAGNETIC CORE ROTATED WITHIN
A STATIONARY COIL PERPENDICULAR TO THE COIL AXIS
Filed Dec. 22, 1964

BOBBIE J. PATTON
INVENTOR.

BY Arthur F. Zobal
ATTORNEY 3,387,377
MAGNETOMETER UTILIZING A MAGNETIC CORE
ROTATED WITHIN A STATIONARY COIL PERPENDICULAR TO THE COIL AXIS
Bobbie J. Patton, Dallas, Tex., assignor to Mobil Oil Corporation, a corporation of New York
Filed Dec. 22, 1964, Ser. No. 420,324
3 Claims. (Cl. 33—204)

ABSTRACT OF THE DISCLOSURE

The specification discloses a magnetometer comprising an elongated member of high magnetic susceptibility rotated within a stationary coil about an axis perpendicular to the axis of the coil for inducing a signal in the coil having a magnitude and phase related, respectively, to the magnitudes and direction of an unknown magnetic field to be measured. The signal induced in the coil has a frequency twice that of the frequency of rotation. This signal is filtered to eliminate signal components due to remanent magnetism of the member. The resulting signal is compared with a reference signal of the same frequency for determining the phase of the signal induced in the coil.

This invention relates to the measurement of magnetic fields and more particularly to a magnetometer for measuring magnetic fields.

In present day research and industry, a need exists for a magnetometer which accurately measures the magnitude and direction of unknown magnetic fields.

In accordance with the present invention, there is provided a novel magnetometer for obtaining such measurements. The magnetometer comprises a highly susceptible member and a stationary pickup coil. Means is provided for rotating the member in close proximity to the coil about an axis different from the axis extending through the center of the coil. In the plane of rotation, the member has a magnetic susceptibility higher in a first direction than in a direction normal thereto. Rotation of the member in the field of interest results in changes in magnetic induction in the member. The changes in magnetic induction in turn cause a signal to be induced in the coil. The signal induced has a magnitude and phase dependent respectively upon the magnitude and direction of the magnetic field. Means coupled to the coil provides an indication of the magnitude and phase of the induced signal to obtain the desired measurements.

In a more specific aspect, in the plane of rotation, the magnetic member has a physical dimension in the first direction greater than that in the direction normal thereto. The axis of rotation of the member is substantially perpendicular to the axis extending through the center of the coil. Upon rotation of the member in the magnetic field, the signal induced in the coil due to changes in magnetic induction has a frequency equal to twice the frequency of rotation. The means for measuring the phase of the signal of interest comprises means for generating a reference signal at a frequency equal to the frequency of the signal induced in the coil and means for comparing the reference signal with the induced signal.

In the system of the present invention, the signal of interest is discriminated from signals due to any remanence of the rotating member, thereby resulting in increased sensitivity. More particularly, the rotating member preferably has no permanent magnetic properties. Slight remanent magnetism, however, does not affect the measurements since the signal induced therefrom will have a frequency equal to the frequency of rotation. As mentioned above, the signal of interest has a frequency twice the frequency of rotation. By employing a means responsive substantially only to the frequency of interest, only the signals due to induced magnetism are selected for measurement, thereby avoiding any zero shift which may occur otherwise.

For a more complete understanding of the present invention and for further objects and advantages thereof, reference may now be had to the following description taken in conjunction with the accompanying drawings, wherein.

Figure 1:
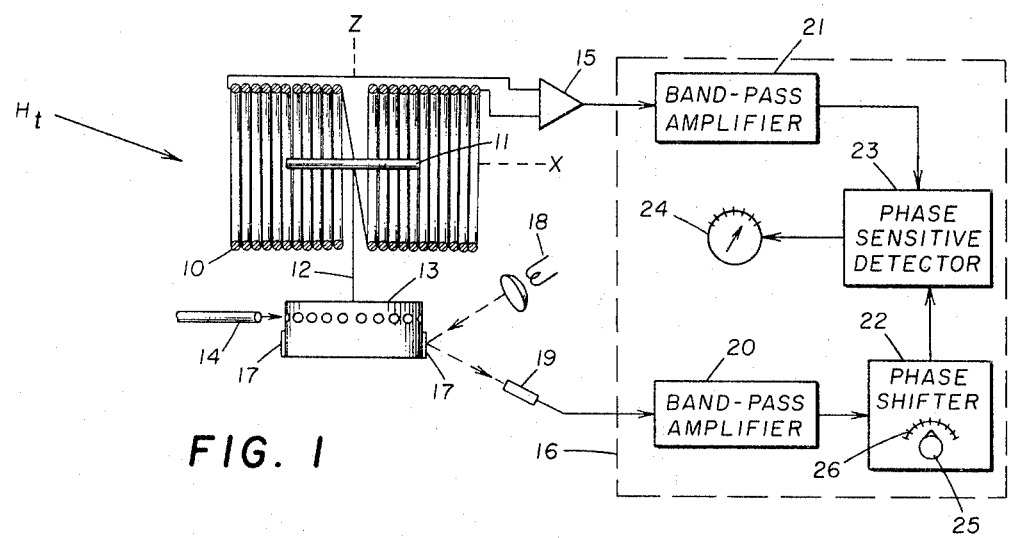
FIGURE 1 illustrates the magnetometer of the present invention.

Referring now to FIGURE 1, there will be described the magnetometer of the present invention for measuring the magnitude and direction of unknown magnetic fields. The total field of interest may be that illustrated at $H_t$. The magnetometer shown comprises a stationary pickup coil 10 having a highly susceptible or permeable magnetic member 11 rotated in close proximity to the coil to obtain the desired measurements. The member 11 is rotated by a shaft 12 coupled to a turbine blade 13 driven by an air jet from source 14. The axis of rotation of the member is perpendicular to the axis extending through the center of the coil.

In the embodiment shown, the member 11 is an elongated bar or rod with the longitudinal axis perpendicular to the axis of rotation. Thus, in the plane of rotation, the susceptibility of the member is greater in one direction than in a direction normal thereto. Rotation of the member 11 in the field $H_t$ results in the induction of magnetization in the member. The magnetization induced is a function of the magnitude of the field component in the plane normal to the axis of rotation of member 11 and, in addition, to the angle between the field component and the longitudinal axis of the member 11. Thus, upon rotation of the member, the induced magnetization varies and causes an alternating change in flux through the coil. This in turn induces an alternating voltage in the coil with the maximum value of the voltage being proportional to the magnitude of the magnetic field component in the plane of measurement. The voltage output of the coil is amplified at 15 and applied to readout 16 for measurement purposes.

The phase of the alternating voltage induced is dependent upon the direction of the magnetic field component in the plane normal to the axis of rotation of member 11. Thus, the phase shift may be measured to record the magnetic field direction in the plane of interest. This is accomplished by generating reference signals during each cycle and applying the reference signals to the readout 16 for comparison with the output of coil 10.

A measurement of the total field $H_t$ and direction may be obtained by rotating the member 11 about two perpendicular axes. In this manner, field components in three perpendicular directions may be obtained. Vector addition of the three components will give $H_t$.

In a mathematical treatment of the output of the coil 10, it can be shown that the voltage or signal induced in the coil may be expressed by the following relationship:

$$\text{E.M.F.} = H_c V \omega \sin(\phi + 2\theta)\left(\frac{1}{N_1} - \frac{1}{N_s}\right) \quad (1)$$

where:

$H_c$ = the magnitude of the magnetic field component in a plane normal to the axis of rotation of the member 11, $V$ = the volume of member 11, $\omega = 2\pi f$, where $f$ is the frequency of rotation of member 11, $\phi$ = the angle between the direction of the magnetic field in the plane of rotation of member 11 and the coil axis, $\theta$ = the angular position of member 11 with respect to the coil axis, $N_l$ = the minimum demagnetization factor (along the longitudinal axis of member 11), and $N_s$ = the maximum demagnetization factor in the plane of spin (normal to the longitudinal axis of member 11).

As can be understood from Equation 1 with V, $\omega$, and $$\left(\frac{1}{N_l} - \frac{1}{N_s}\right)$$

constant, the voltage generated is a sinusoidally varying voltage having a maximum value proportional to $H_c$. For a magnetic field in a given direction there will be a phase shift in the voltage dependent upon $\phi$.

Figure 3A:
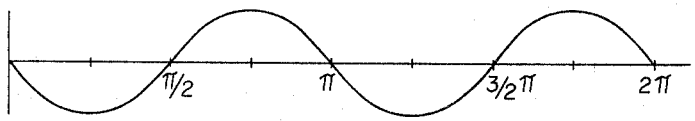
FIGURES 3A–3C are curves useful in understanding the present invention.
Figure 2:
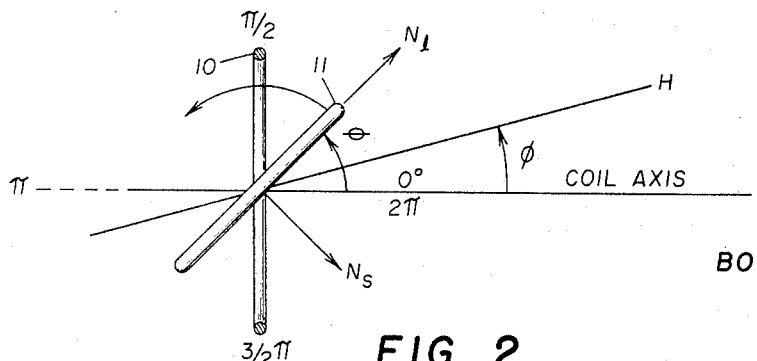
FIGURE 2 is another illustration of the magnetometer showing the rotation of the sensitive element with respect to the coil axis.

FIGURE 2 illustrates more clearly the relationship between the coil axis, the angular position of member 11, and the direction of the magnetic field. In this example, the direction of rotation is counterclockwise. If $\phi$ equals zero degree, the voltage generated during a complete cycle of member 11 and beginning at $\theta$ equal zero is illustrated in FIGURE 3A. If, however, $\phi$ equals another value, for example sixty degrees, the voltage generated is that illustrated in 3B. As shown, a shift in phase has occurred. The phase shift is equal to $\phi/2$ and thus is a measure of the direction of the magnetic field in the plane of rotation.

Figure 3B:
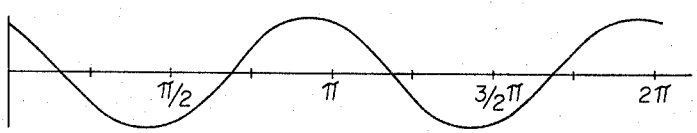

In FIGURES 3A and 3B, it is to be noted that the frequency of the electric signal is twice that of the frequency of rotation. This is due to the fact that the induced magnetism reaches a maximum value twice during each cycle of rotation, as can be understood by those versed in the art. This phenomenon is important in the present system since it allows me to select only the signals resulting from the induced magnetism, thereby reducing the effect of slight remnant magnetism in the member 11. Selection of the signal of interest is carried out by employing a narrow band detection system. The detection system is made responsive to a narrow frequency band to pass substantially only signals having a frequency twice the frequency of rotation of member 11. Thus, any remnant magnetism of member 11 will not affect the measurements since such remanence will induce a signal having a frequency only equal to the frequency of rotation. Signals of this frequency are rejected by the detection system and hence do not affect the measurements.

Figure 3C:
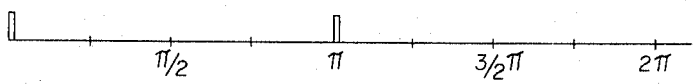

A more detailed description of the system of the present invention now will be given. In the embodiment disclosed, the reference signals for measuring the voltage phase shift signals are generated by means rotated in synchronism with member 11. More particularly, referring to FIGURE 1, the means for generating the reference signals comprises two mirrors 17 attached to turbine blade 13 at locations spaced 180° apart, a lamp 18, and a photocell 19. As the turbine blade 13 rotates, light from lamp 18 is reflected from the mirrors onto photocell 19 to produce the reference signals. By employing two mirrors, the reference signals are generated at the same frequency as the frequency of the signal induced in coil 10. FIGURE 3C illustrates the reference signals which may be generated.

In one emodiment, the readout 16 may comprise an oscilloscope with the output of coil 10 applied to the deflection plate and the reference signals applied to the sweep circuit. In this embodiment, a narrow band filter may be employed intermediate the amplifier 15 and readout 16 for selecting the frequency of interest.

In a preferred embodiment, the readout 16 comprises a narrow band phase sensitive detection system such as that described in Electronics, Robert D. Moore, June 8, 1962, pp. 40–43, and available from Princeton Applied Research Corporation, Princeton, N.J., as Model No. JB-5. Such a system comprises band-pass amplifiers 20 and 21 coupled respectively to phase shifter 22 and phase sensitive detector 23. As illustrated, the output of phase shifter 22 also is applied to the phase detector 23 which controls a meter 24.

The system is made responsive only to signals having a frequency in the range of interest by adjustment of instrumentation including band-pass amplifiers 20 and 21. Measurements are obtained by adjusting dial 25 of phase shifter 22 until the dial of meter 24 reflects a maximum value. When this occurs, the phase of the reference signal is matched with the phase of the signal to be measured. The maximum value read from meter 24 is a measure of the magnitude of the magnetic field. The amount of phase shift required to bring the two signals to the same phase is read from the indicia marks 26 of phase shifter 22 and is a measure of the direction of the magnetic field. Initial calibration may be carried out by applying a known field to the magnetometer and adjusting the system in accordance with the known parameters of the field.

As mentioned above, the direction of the field measured is that only in the plane normal to the axis of rotation of member 11. Measurements in two perpendicular planes are required to obtain the three-dimensional total field. For example, a first measurement may be obtained in the horizontal $xy$ plane by positioning the coil axis in the $x$ direction (for example as shown in FIGURE 1) and rotating the member 11 about the perpendicular or $z$ axis. The coil signal measured is the magnitude of the field component in the $xy$ plane. The angle $\phi$ is the direction of the field in the $xy$ plane with respect to the coil axis. Knowing this information, the field components in the $x$ and $y$ direction may then be calculated. The direction of the field in the $z$ direction may be determined by maintaining the axis of the coil 10 in the horizontal $x$ direction shown in FIGURE 1 and moving the shaft 12 to a position whereby the axis of rotation is in the $y$ direction but perpendicular to the axis extending through the coil.

In this position, the coil signal measured is the magnitude of the field component in the $xz$ plane. The angle $\phi$ is the direction of the field in the $xz$ plane with respect to the coil axis. With this information, the $z$ component of the field then may be calculated. The total field and direction may be obtained by vector addition of the $x$, $y$, and $z$ components of the field.

As described previously, the magnitude of the magnetic field is proportional to the $$\omega\left(\frac{1}{N_l} - \frac{1}{N_s}\right)$$

To obtain a high sensitivity, the frequency of rotation should be as high as practical. Also important to sensitivity are the demagnetization factors. These factors are magnetic parameters, which are shape controlled for materials of high permeability or susceptibility. Increased sensitivity is obtained by having the longitudinal dimension of member 11 large in relation to the dimension normal thereto in the plane of rotation.

In one embodiment, the member 11 may have a longitudinal dimension of one inch with a square cross section having sides of one-fourth of an inch. The frequency of rotation of such a member may be of the order of 30,000 r.p.m. In a further embodiment, the member 11 may be a coin-shaped member spun upon its edges. A suitable coin-shaped member may have the thickness of one-half to one-tenth the diameter.

Preferably, the member 11 is of a ferromagnetic material such as mumetal. The turbine blade 13 as well as the shaft 12 are of nonmagnetic materials, such as a plastic.

While the invention has been described in connection with certain embodiments thereof, it will be understood that certain modifications will suggest themselves to those skilled in the art and it is intended to cover such modifications as fall within the scope of the appended claims.

What is claimed is:

1. A magnetometer for investigating magnetic fields of interest and originating from a source external to said magnetometer, comprising:
   a highly susceptible member having a dimension in a first direction greater than that in a second direction normal to said first direction,
   a stationary pickup coil,
   means for rotating said member within said coil about an axis extending in a direction perpendicular to a plane parallel to said first and second directions for periodically inducing a signal of interest in said coil having a magnitude related to that of a field to be measured and a frequency at least twice that of the frequency of rotation,
   said axis of rotation being different from that extending through the center of said coil,
   means for generating reference signals at a frequency equal to twice the frequency of rotation of said member, and
   means for comprising said reference signals with said induced signal for providing an indication of the phase of the signal induced in said coil to obtain a measure of the direction of the magnetic field of interest.

2. The system of claim 1 wherein:
   said member is a ferromagnetic member, said axis of rotation being substantially perpendicular to the axis extending through the center of said coil.

3. The system of claim 2 including:
   means connected between said pickup coil and said comprising means and responsive substantially only to signal components from said pickup coil having a frequency equal to at least twice the frequency of rotation of said member to reduce the effect of remnant magnetism of said member on said signal of interest.

References Cited

UNITED STATES PATENTS

| 2,444,290 | 6/1948 | Granqvist | 33—204 |
| 1,774,458 | 8/1930 | Tear | 33—204 |
| 1,939,690 | 12/1933 | Gunn | 324—47 |
| 1,976,723 | 10/1934 | Gunn | 33—204 |

FOREIGN PATENTS 121,949  6/1948  Sweden.

OTHER REFERENCES

Kan, Georges: New Uses for Fluxgate Principle; Electronic Industries, August 1960, pp. 107–110.

RUDOLPH V. ROLINEC, *Primary Examiner.*

R. J. CORCORAN, *Assistant Examiner.*